Patented Sept. 1, 1931

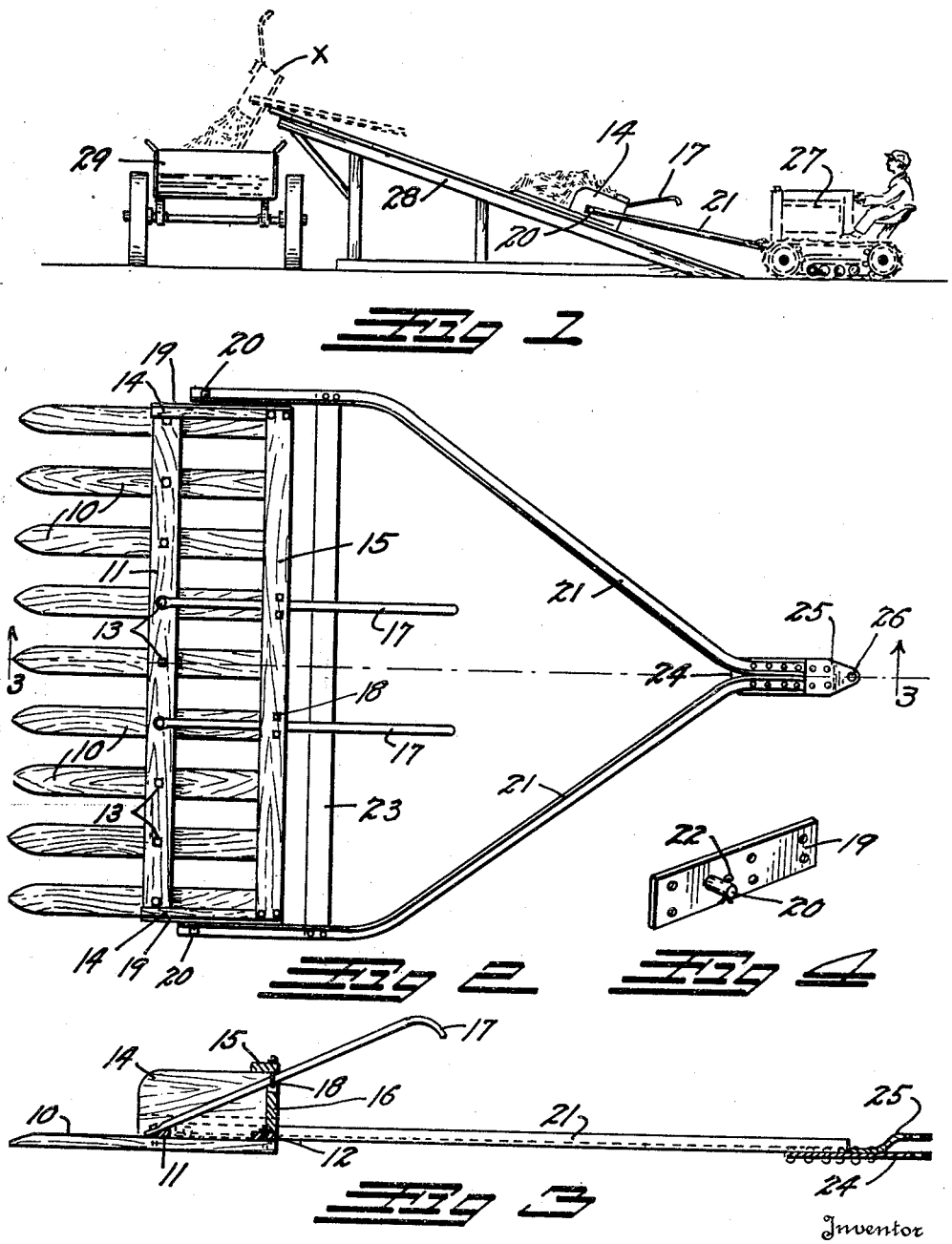

1,821,074

UNITED STATES PATENT OFFICE

CARL A. PETERS, OF MEAD, COLORADO

MANURE LOADER

Application filed April 26, 1930. Serial No. 447,658.

This invention relates to a tractor-operated loading device, more particularly designed for loading manure into a manure spreader or truck for distribution upon the field. The principal object of this invention is to provide a simple mechanism by means of which a tractor operator may gather, elevate and deposit the manure into the spreader in relatively large quantities, so that the spreader will be quickly filled for its return to the field.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation illustrating the operation of the improved loader.

Fig. 2 is a plan view of the improved loader.

Fig. 3 is a section therethrough, taken on the line 3—3, Fig. 2.

Fig. 4 is a detail perspective view illustrating the pivot plates employed upon the device.

In Fig. 1 a manure spreader is indicated at 29 and a typical tractor at 27. The invention comprises a series of relatively flat, pointed teeth 10, preferably formed of hard wood. The teeth 10 are held in spaced relation by means of a beveled, front cross piece 11 and a rear cross piece 12. The cross pieces 11 and 12 are bolted to the teeth 10 by means of suitable bolts 13. Side boards 14 project upwardly at the sides of the device and are connected together by means of an upper cross piece 15. A back member 16 is secured between the side boards 14.

A pair of handles 17 are secured to two of the bolts 13 on the cross piece 11 and are secured under the upper cross piece 15 by means of U bolts 18. A pair of pivot plates 19 are bolted at each side of the device to the side boards 14. Each of the pivot plates 19 carries a pivot stud 20.

An A-shaped angle iron frame 21 is pivoted at its forward extremities upon the pivot studs 20 and is held thereon by means of cotter pins 22. A cross brace 23 ties the two arms of the frame 21 together and prevents them from spreading. The apex of the A-shaped frame 21 is secured to a gusset plate 24, from which a second plate 25 projects. A pin opening 26 is formed through the two plates 24 and 25 by means of which the device may be secured to the draw bar of a tractor.

The device is employed in combination with an inclined platform 28, such as illustrated in Fig. 1. In use, the tractor operator gathers his load by forcing the device ahead of him either into or through the manure pile. He then pushes the load up the inclined platform 28. When the top is reached the entire carrying structure will tilt downwardly suspended upon the pivot pins 20 as indicated in broken line at "X", Fig. 1. The pivot pins 20 are arranged somewhat nearer the rear of the device so that the weight of the teeth and their load will cause the device to tilt downwardly when it is shoved beyond the edge of the platform 28.

It will be noted that the device can be forced well beyond the edge of the inclined platform 28 where it will be supported by the A shaped frame so that the load can be distributed in the body of the loader 29.

As the operator reverses his tractor the edge of the platform 28 will turn the teeth 10 upwardly to their normal position allowing the device to be backed down the platform for the next load. For final clean-ups where it is desired to scrape close to the ground a second operator can lift upwardly on the handles 17 to cause the teeth 10 to dig deeply under the pile.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A manure loading device comprising: a series of relatively flat teeth; cross pieces securing said series in spaced relation; side boards arranged at the extremities of said cross pieces; and an A-shaped pushing frame pivoted at its two extremities to said side boards; and a plate at the apex of said A-shaped frame for attachment to a tractor.

2. A manure loading device comprising: a series of relatively flat pointed teeth; cross pieces securing said series in spaced relation; side boards arranged at the extremities of said cross pieces; an A-shaped pushing frame pivoted at its open extremity to said side boards; a plate at the apex of said A-shaped frame for attachment to a tractor; and a cross member in said A-shaped frame to prevent the latter from spreading.

3. A manure loader comprising: a series of relatively flat spaced apart teeth; cross pieces secured to and holding said teeth in parallel relation; side boards at the extremities of said cross pieces; an upper cross piece connecting the tops of said two side boards; handles extending rearwardly from said cross pieces supported by said upper cross piece; and an A-shaped frame adapted to spread outside of said two side boards; means for pivoting said frame to said side boards; and means for securing a tractor to the apex of said frame.

4. A manure loader comprising: a series of relatively flat spaced apart teeth; cross pieces secured to and holding said teeth in parallel relation; side boards at the extremities of said cross pieces; an upper cross piece connecting the tops of said two side boards; pivot plates secured to the outer faces of said side boards; pivot studs projecting outwardly from said pivot plates; angle iron members journaled on said pivot studs, said members being brought together at their one extremity; and means for securing a tractor thereto at the brought-together extremities.

In testimony whereof, I affix my signature.

CARL A. PETERS.